(12) United States Patent
Anders et al.

(10) Patent No.: US 7,891,381 B2
(45) Date of Patent: Feb. 22, 2011

(54) PIPE AND TUBE REHABILITATION LINERS AND CORRESPONDING RESINS

(75) Inventors: Richard M. Anders, Port Washington, WI (US); James A. Waigright, Cairo, GA (US)

(73) Assignee: NOVOC Performance Resins, Sheboygan, WI (US)

( * ) Notice: Subject to any disclaimer, the term of this patent is extended or adjusted under 35 U.S.C. 154(b) by 0 days.

(21) Appl. No.: 12/027,504

(22) Filed: Feb. 7, 2008

(65) Prior Publication Data

US 2008/0277013 A1 Nov. 13, 2008

Related U.S. Application Data

(63) Continuation-in-part of application No. 11/747,031, filed on May 10, 2007, now abandoned.

(51) Int. Cl.
*F16L 55/16* (2006.01)
(52) U.S. Cl. .................. 138/98; 138/97; 405/150.1; 405/184.2
(58) Field of Classification Search ............... 138/97, 138/98, 125; 264/36.16; 405/150.1, 184.2
See application file for complete search history.

(56) References Cited

U.S. PATENT DOCUMENTS

| | | | | |
|---|---|---|---|---|
| 2,840,881 | A | * | 7/1958 | Bateman ............... 442/272 |
| 3,996,967 | A | | 12/1976 | Takada |
| 4,064,211 | A | | 12/1977 | Wood |
| 4,243,075 | A | * | 1/1981 | McPherson et al. ...... 138/174 |
| 4,390,574 | A | | 6/1983 | Wood |
| 4,723,579 | A | * | 2/1988 | Hyodo et al. ............ 138/124 |
| 4,836,715 | A | | 6/1989 | Wood |
| 4,877,665 | A | * | 10/1989 | Higuchi et al. ............ 428/36.1 |
| 4,902,215 | A | | 2/1990 | Seemann, III |
| 4,913,937 | A | * | 4/1990 | Engdahl et al. ............ 427/314 |
| 4,976,290 | A | | 12/1990 | Gelin et al. |
| 5,052,906 | A | | 10/1991 | Seemann |
| 5,186,987 | A | * | 2/1993 | Imoto et al. ............ 428/34.5 |
| 5,240,533 | A | | 8/1993 | Bottger et al. |
| 5,334,429 | A | | 8/1994 | Imoto et al. |
| 5,411,060 | A | * | 5/1995 | Chandler ............... 138/98 |
| 5,445,875 | A | | 8/1995 | Persson |

(Continued)

OTHER PUBLICATIONS

Borje Persson, UV Cured in Place Liners, Radtech Report, May/Jun. 2001, pp. 28-30.

*Primary Examiner*—James F Hook
(74) *Attorney, Agent, or Firm*—Boyle Fredrickson, S.C.

(57) ABSTRACT

A material composition and method for making flexible inversion liners having glass fibers added for strength is disclosed. The liner combines a first layer of polyester felt, an open-faced knit of fabric from ECR glass and PET strands, glass fibers, and a second layer of polyester felt. These components are needle-punched together into essentially a single composite mat, or substrate, using standard needle-punching machinery. The liner is then formed into a tube preferably through a butt joint and prayer stitch covered with a urethane tape. A coating or foil is placed on the outside (prior to inversion) of the liner that is then impregnated with a resin. The resin can have low levels of volatile organic compounds, and can be thermosetting or UV-curable. The liner is then installed in a pipe through an inversion technique using, e.g., either air or water, and cured with UV radiation, steam, or hot water.

20 Claims, 8 Drawing Sheets

U.S. PATENT DOCUMENTS

| | | | |
|---|---|---|---|
| 5,458,960 A * | 10/1995 | Nieminen et al. | 442/404 |
| 5,480,697 A | 1/1996 | Bottger et al. | |
| 5,501,248 A * | 3/1996 | Kiest, Jr. | 138/98 |
| 5,535,786 A * | 7/1996 | Makela et al. | 138/98 |
| 5,836,357 A | 11/1998 | Kittson et al. | |
| 5,868,169 A | 2/1999 | Catallo | |
| 5,873,391 A | 2/1999 | Kittson et al. | |
| 5,883,021 A * | 3/1999 | Beer et al. | 442/172 |
| 5,911,246 A | 6/1999 | Kittson et al. | |
| 5,931,199 A | 8/1999 | Kittson et al. | |
| 6,037,035 A | 3/2000 | Bottger et al. | |
| 6,042,668 A * | 3/2000 | Kamiyama et al. | 156/93 |
| 6,164,095 A * | 12/2000 | Rock et al. | 66/194 |
| 6,254,709 B1 * | 7/2001 | Kamiyama et al. | 156/91 |
| 6,296,729 B1 * | 10/2001 | Kamiyama et al. | 156/93 |
| 6,360,780 B1 * | 3/2002 | Adolphs et al. | 138/98 |
| 6,646,057 B1 | 11/2003 | Anders et al. | |
| 6,708,729 B1 | 3/2004 | Smith | |
| 6,837,273 B2 | 1/2005 | Woolstencroft et al. | |
| 6,923,217 B2 * | 8/2005 | Smith | 138/98 |
| 6,932,116 B2 | 8/2005 | Smith et al. | |
| 7,025,580 B2 * | 4/2006 | Heagy et al. | 425/11 |
| 7,048,985 B2 | 5/2006 | Mack et al. | |
| 7,060,156 B2 | 6/2006 | Mack et al. | |
| 7,096,890 B2 | 8/2006 | Woolstencroft et al. | |
| 2002/0124898 A1 * | 9/2002 | Renaud et al. | 138/98 |
| 2003/0113489 A1 | 6/2003 | Smith | |
| 2004/0134551 A1 * | 7/2004 | Warren | 138/98 |
| 2006/0005893 A1 * | 1/2006 | Kaneta et al. | 138/98 |
| 2006/0225802 A1 * | 10/2006 | Kamiyama et al. | 138/98 |

* cited by examiner

PRIOR ART

PIPE AND TUBE REHABILITATION LINERS AND CORRESPONDING RESINS

CROSS-REFERENCE TO RELATED APPLICATIONS

This application is a continuation-in-part of and claims priority to U.S. patent application Ser. No. 11/747,031, filed on May 10, 2007 now abandoned and entitled Reinforcing Liner, which is expressly incorporated by reference herein in its entirety.

BACKGROUND OF THE INVENTION

1. Field of the Invention

The present invention relates generally to the field of tube strengthening. More particularly, the present invention relates to a reinforcing liner for use in pipe rehabilitation, wherein the liner is saturated with curable resin, introduced into a tube or pipe, shaped to conformingly line the pipe, and cured in place so as to form a rigid liner.

2. Discussion of Related Art

Various methods of rehabilitating a tube, such as a pipe that is buried underground, are known in the art. Generally speaking, such methods include the use of a liner having a diameter that is substantially the same as the inner diameter of the pipe to be rehabilitated. The liner frequently includes an impermeable layer and an adjacent resin-absorbing layer. This resin-absorbing layer is soaked with a liquid resin prior to the introduction of the liner into the pipe. After being properly positioned in the pipe, the liner is pressed against the inner surface of the pipe by fluid pressure.

Most liners in such applications utilize a layer of nonwoven felt for the resin-absorbing layer of the liner. One of the purposes of the felt is to provide support for the uncured resin of the impregnated liner. The felt serves as a reservoir and/or carrier means for the uncured resin. Once cured, the resin provides the structural strength of the liner.

These so-called cured-in-place liners are typically installed in environments that are continuously exposed to water and other corrosive materials. Cured-in-place liners are also exposed to varying temperatures and flow conditions.

The below-referenced U.S. patents disclose embodiments that were at least in part satisfactory for the purposes for which they were intended. The disclosures of all of the prior United States patents discussed herein are hereby expressly incorporated by reference into the present application in their entireties for purposes including, but not limited to, indicating the background of the present invention and illustrating the state of the art.

Wood's U.S. Pat. No. 4,390,574 discloses an inversion (called eversion) liner that is strengthened by blowing chopped glass fibers onto the web prior to a needling stage. The needling "entangles" the chopped glass fibers with the fibers of the web.

Wood's U.S. Pat. No. 4,836,715 also discloses a liner. However, this later Wood patent generally discusses with disfavor liners having polyester fibers extending orthogonally to the plane of the liner material caused by needling. According to Wood, the tensile strength of a liner is negatively impacted by fibers orientated this way. Thus, this Wood patent attempts to solve this by adding layers of reinforcing fibers, including glass, orientated in a circumferential direction.

U.S. Pat. No. 4,902,215 and U.S. Pat. No. 5,052,906, issued to William H. Seemann, address the use of a flow medium fed by a "pervious conduit" (a resin feed or channel) communicating with the flow medium, to combine use of core materials with resin flow features and reusable vacuum bags with integral resin feeds and distribution networks.

Kittson et al. U.S. Pat. Nos. 5,836,357 (and divisionals 5,873,391, 5,911,246, and 5,931,199) discloses an inversion liner constructed of several layers of materials. Two of these layers contain chopped glass fibers. The glass fibers are stitched or sewn onto a polyester felt and are randomly orientated in an x-y plane.

The prior art as described in U.S. Pat. Nos. 5,240,533, 5,480,697, and 6,037,035 demonstrates an "integrated sandwich structure". The patents generally provide for a means of manufacturing (weaving) the "integrated sandwich structure" so as to optimize the structure's ability to maintain x and y fiber plane separation during composite processing.

Smith's U.S. Pat. Nos. 6,708,729 and 6,932,116 disclose a reinforced liner consisting of several layers, one of which includes reinforced fibers, preferably carbon or glass. It is further disclosed that these fibers may be arranged in one axis, in one plane or randomly in all three axes, such as with standard felt. However, the preferred alignment is circumferential.

Woolstencroft et al.'s U.S. Pat. Nos. 6,837,273 and 7,096,890 disclose the use of chopped glass fibers mechanically bonded to a flexible felt layer. The fibers can be bonded to the flexible layer by a light needling process that keeps the majority of glass fibers "properly" orientated, i.e., in the x-y plane.

Mack et al.'s U.S. Pat. Nos. 7,060,156 and 7,048,985 disclose a three-dimensional "spacer" fabric for laminates and discusses various "z direction" reinforcing fibers that can be used including glass fibers.

Many of these previously recognized solutions have the disadvantage of being not completely effective and having a relatively high cost. Further, in many instances of cured-in-place pipelining, the final product fails to meet the required ASTM standards. If these standards are not met, then catastrophic failure of the liner is possible due to the external buckling pressure exerted by the hydrostatic load and soil compaction or lack of compaction.

In some cases, point load failure is probable because the liner's cross sectional thickness is increased too much. This reduces the internal diameter of the host pipe which can result in loss of hydraulic capacity. Where point loading is not a problem, the amount of head pressure used to install a typical liner oftentimes compresses the cross sectional thickness below an acceptable level as determined by the ASTM standards for cured-in-place pipe.

Also, underground pipes, especially failing or nearly failing underground pipes, can present an extremely harsh use environment for rehabilitating liners. Failing or nearly failing underground pipes can be subject to, e.g., exposure to moisture or wet material flow, fungi, microbial and other organism influences, aerobic and/or anaerobic conditions, acid and/or basic conditions, and/or other extreme environmental conditions. Numerous resins are ill suited for prolonged exposure to such harsh use environments. Correspondingly, such numerous known resins cannot be used during pipe rehabilitation because they afford unacceptably short duration use lives.

Furthermore, many resins can pose unacceptable contamination risks to the contents flowing through the pipes. Other resins can pose potential threats to, e.g., the environment during installation and use. For example, numerous known risks are associated with resins that are solvent based. Most solvent based resins and other resins include or contain a variety of hazardous air pollutants (HAPs), various volatile organic compounds (VOCs), all of which can be damaging to the environment and/or individuals exposed to such HAPs and VOCs.

What is needed therefore is an invertible liner that may be used with the smaller diameter tubes. What is further needed is a liner that insures that ASTM standards are consistently met without dramatically increasing the cost of the finished product. What is also needed is a liner that has a flexible, three-dimensional weave or knit design. What is also needed is a system with installation processes that are similar to current processes so that installers do not need to be retrained. What is also needed is a system that incorporates resins that do not compromise the integrity of the constituents flowing through rehabilitated pipes and provide suitable use lives before requiring repair or subsequent rehabilitation. Furthermore, pipe rehabilitation systems are needed that utilize resins with few or no HAPs and/or VOCs.

SUMMARY AND OBJECTS OF THE INVENTION

By way of summary, the present invention is generally directed to a liner with fibers needle punched into a flexible mat to better fit and reinforce a pipe or tube.

In one embodiment, the invention is preferably a high tensile strength fiberglass-reinforcing member for tubular structures. For example, the member is used for at least one of the following: oil pipe, HVAC duct, water main, gas main, potable water pipe, manhole line, sewer, industrial effluent lines, electrical conduit repair, and/or others as desired. The member preferably comprises a mat that includes an absorbent fabric or felt, a flexible, three-dimensional material on top of the felt, and a fiberglass on top of the felt. The fiber may be a chopped fiber, carbon fiber, glass flake, chunks, glass particles of uniform or non-uniform thickness, or any combination thereof. A second layer of fabric or felt may be added on top and a cover or coating may be added on one side of this felt. The felt preferably prevents wrinkling of the member.

In one preferred embodiment, the mat is needled to create a monolithique sandwich. For example, the layers of the mat are held together by fiberglass fragments orientated perpendicular to the felt. Preferably, the inventive mat is formed by punching or needling the fiber all the way through the layers. Once punched, the fiber orientated in the Z-position also assists in soaking and curing the mat by allowing an agent, e.g., resin, to more thoroughly soak into the felt layers.

For larger pipes, the mat is added to another mat of a similar configuration to form another mat layer. These mat layers may be joined together by stitching, flame bonding, or taping together or any combination thereof.

The cover prevents the resin or other agent from oozing out of the mat when the mat is applied to a tube. In one embodiment, the cover is a foil comprised of at least one of the following: a nylon blend or PET.

Once inverted into a tube or pipe, an agent is added to the mat for hardening or fixing the mat in place. The agent is at least one of the following: a resin, an epoxy, phenolic, polyester, urethane, vinylester, polyimide, and peroxide. The agent is applied by at least one of the following: wetting, impregnating, saturating, and soaking. This is accomplished by, e.g., applying the resin with a resin slug and a pinch roller. The resin prevents wicking.

In one embodiment, the member is an invertible fiberglass liner for a twelve-inch or less tube. In another embodiment, the member is pulled in place.

The unique configuration of the member minimizes effects of load buckling and redistributes the load. For example, it transfers load in a spiral rather than just in a hoop and down the pipe direction. Thus, the load is preferably transferred at 0, 45, 90 degrees.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

It should be noted that the shading in the FIGS. is meant to differentiate between the various layers and not to represent a particular material, graphical symbol, or color, unless otherwise indicated.

DESCRIPTION OF PREFERRED EMBODIMENTS

The present invention and the various features and advantageous details thereof are explained more fully with reference to the non-limiting embodiments described in detail in the following description.

1. System Overview

When rehabbing piping under the ground, the pipes or lines do not normally have to be excavated. For example, current fiberglass reinforcing liners are normally pulled in place. Invertible liners are also used for rehab. However, these are generally restricted to a diameter size that can be successfully inverted.

While the present invention can be pulled into place, it is preferably an invertible glass reinforced cured-in-place polyester liner. The liner of the present invention preferably has a polyester fabric or felt layer. A knit or woven layer is added that is comprised of a corrosion resistant glass and high tenacity polyester fiber combination. The felt and knit layers are preferably needle punched with corrosion resistant glass, e.g., ECR, of varying denier sizes. A coating is preferably added to the outside of the felt layer. This coating may consist of urethane, TPU, PVC, PE, PP, and combination thereof. All of these layers combined together make a composite substrate that is then constructed into a soft flexible tube of any size.

It should be noted that the combination of such materials in layers, when placed under strain, distributes the load evenly around a given point. This thereby reduces point load failure due to increased hydrostatic pressure and yet maintains minimum cross sectional thickness of the liner.

2. Detailed Description of Preferred Embodiments

In describing the preferred embodiment of the invention, which is illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the words "connected", "attached", or terms similar thereto are often used. They are not limited to direct connection but include connection through other elements where such connection is recognized as being equivalent by those skilled in the art.

Figure 1:
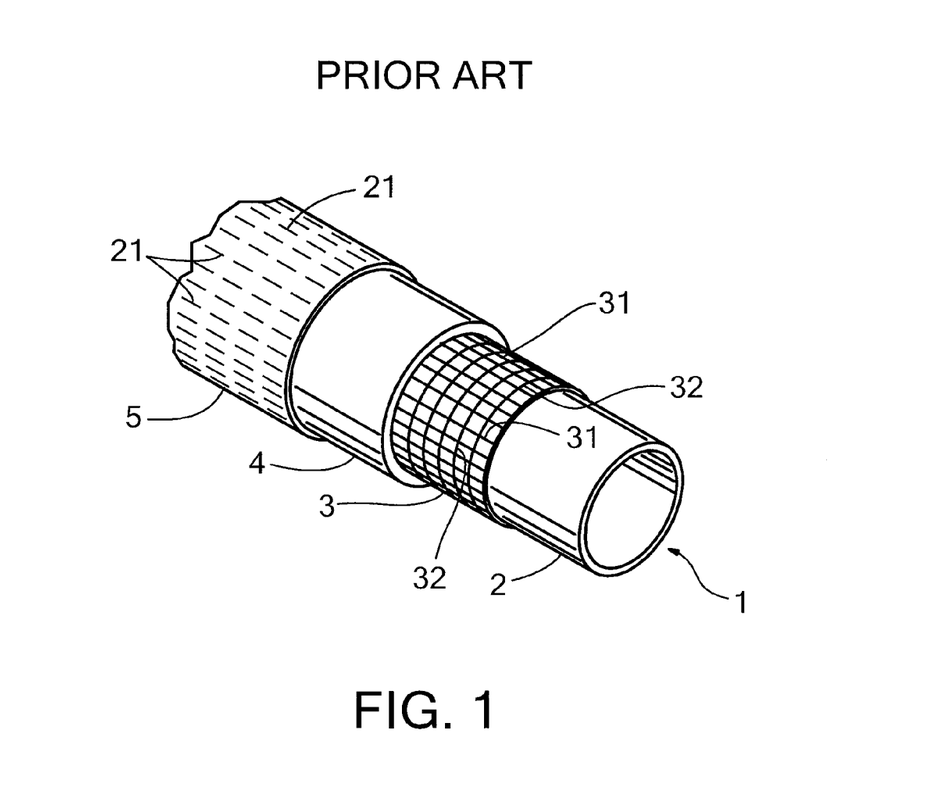
FIG. 1 illustrates a perspective view of a conventional lining hose appropriately labeled "PRIOR ART"

FIG. 1 shows a prior art liner as discussed above, while FIGS. 2-8 show the present invention which includes a liner for reinforcing a tube or pipe.

By way of example from U.S. Pat. No. 5,868,169, FIG. 1 of the present application shows lining hose 1 with an inner layer of resin-absorbing material 2 comprising a layer of nonwoven polyester felt of two-eight mm in thickness. The layer of reinforcing fibers 3 is a relatively thin, up to two mm thick, mesh of fiberglass fibers. The outer layer of resin-absorbing material 4 is a two-eight mm thick layer of nonwoven polyester felt. The thickness of the various layers depends upon such factors as the size, length, and depth of a given pipe to be lined. However, it should be noted that the layer of felt can be a deterrent to the strength of the liner after the resin has cured since it occupies space that could otherwise be filled with resin. An impermeable plastic material comprises the outer covering or layer 5. Examples of the plastic material used for layer 5 include polyurethane, polypropylene, and polyethylene.

Prior to inserting the lining hose into the pipe to be lined, the resin absorbent material of lining hose 1 shown in FIG. 1 is soaked with a volume of resin that exceeds the volume required to totally saturate the inner and outer layers of resin absorbent material, layers 2 and 4 respectively. The inner and outer layers of resin absorbent material may be saturated with resin using vacuum impregnation or injection methods that are commonly known in the art. The lining hose 1 must be saturated with a sufficient volume of resin so that the layer of reinforcing fibers 3, as shown in FIG. 1, is encapsulated in resin during both the uncured and cured stages of installation. Reinforcing layer 3 has reinforcing fibers that are shown as longitudinal fibers 31, which are parallel to the longitudinal axis of the lining 1 and radial fibers 32 which are generally radial to that axis.

The introduction of resin may be performed directly at the installation site or at an appropriate off-site location. After the volume of resin has been introduced into the lining hose, the outer covering layer 5 is perforated so as to provide the outer covering layer with flowthrough openings 21 as illustrated in FIG. 1.

Figure 2:
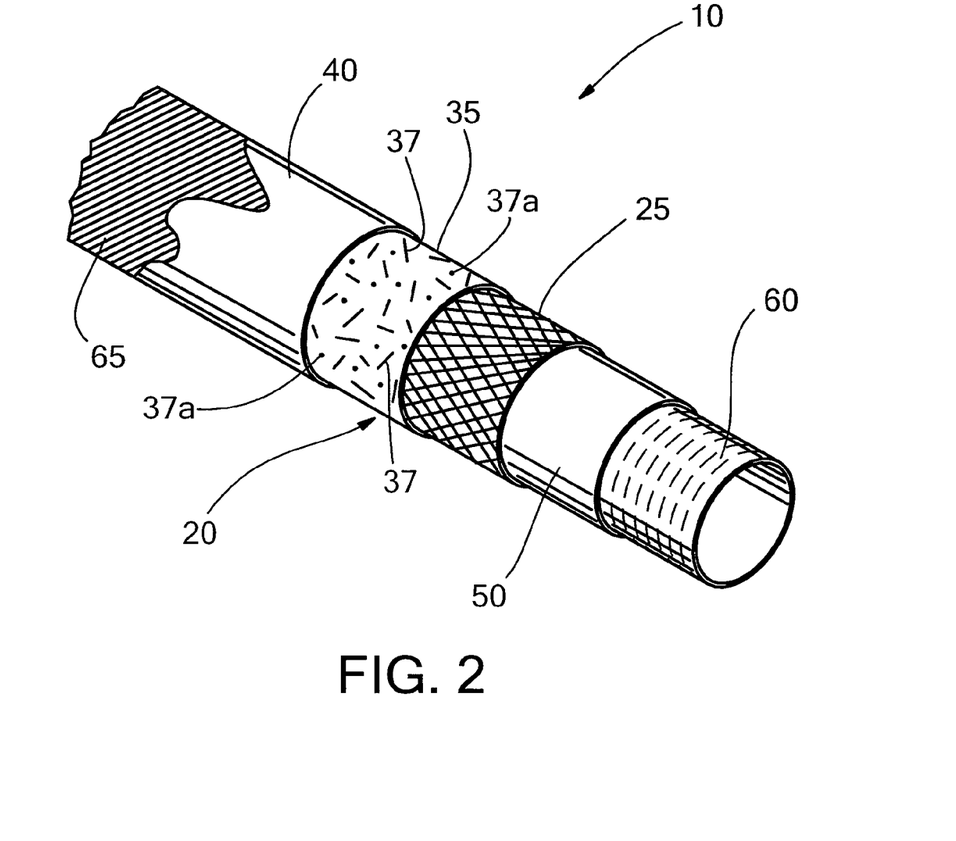
FIG. 2 illustrates a perspective view of one embodiment of a member according to the present invention.

FIG. 2 is a perspective view of a liner of the present invention. The present invention includes a member 10 which is preferably an inverted liner comprised of a mat 20. The mat 20 includes several components. For example, the mat 20 preferably includes a three-dimensional material 25 adjacent at least one layer of felt material 40. A second felt layer 50 may be added. Between the three-dimensional material 25 and the first felt layer 40 is layer 35 of fiberglass 37 and 37a, which is laid on the felt 40. On the second layer of felt 50, is preferably a coating or cover 60.

Prior to installation, the mat 20 is preferably soaked with a resin 65 that preferably penetrates through all the layers, e.g., 25, 35, 40, and 50.

Figure 3:
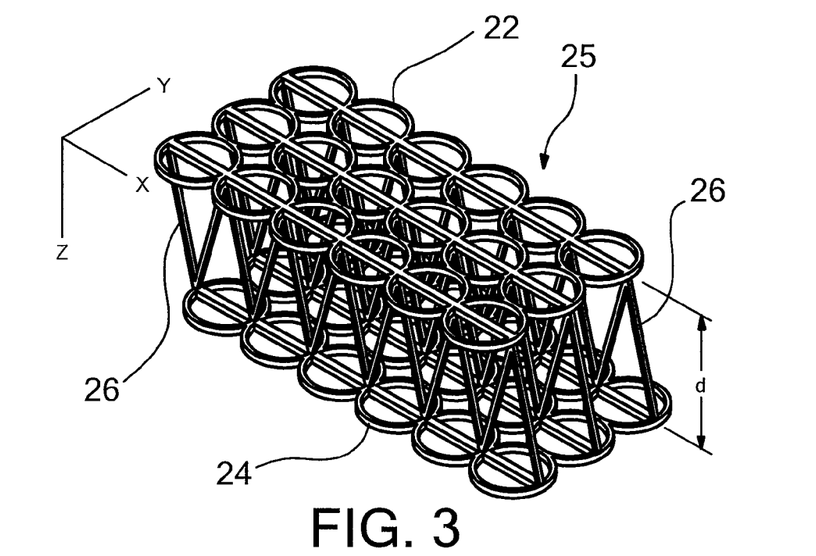
FIG. 3 illustrates a schematic view of a material of the present invention.

As shown in FIG. 3, the three-dimensional material 25 preferably has a unique knit or weave configuration. Such material 25 may include strands or lengths of polymer materials woven together. The material 25 may also include some fiberglass or carbon in addition to the polymer materials. Polynova, located in Milford, Mass., typically provides such materials and textiles for closed-mold interlaminar vacuum infusion processes. Preferably, the material 25 of the present invention is Polynova's POLYBEAM or HIFLUXF90™ material.

Preferred characteristics of these materials may be as follows:

POLYBEAM 703 PET:

x,y fiber type: multi-filament polyester (PET)

z fiber type: mono-filament polyester (PET)

areal weight: 0.800 oz./ft.2 infused weight: 2.540 oz./ft.2 thickness: 0.026 inches roll width: 60 inches std., to 160 inches roll length: to suit

HIFLUX90™ PET:

x,y fiber type: high tenacity polyester areal weight: 1.26 oz./ft.2 infused weight: 5.07 oz./ft.2 thickness: 0.056 inches roll width: 60 inches std., to 160 inches roll length: to suit.

Alternatively, instead of HIFLUX90™, the material 25 may be a continuous strand fiberglass that is looped upon itself. This material 25 is preferably an ACR glass Fiber Reinforced Plastic (FRP) mat available from Superior Fibers Inc. of Bremen, Ohio Referring again to the drawings, FIG. 3 schematically illustrates a representative fabric material 25 in a free or uncompressed relaxed form. As shown in this illustration of, e.g., HIFLUX90™, there is preferably a pair of outer, generally woven fabric layers 22 and 24 lying generally in the respective X-Y planes. Separating, and disposed between, these layers are a plurality of resilient fibers or yarns 26 lying generally in a "Z direction." The Z direction fibers need not be at an exact 90-degree orientation, and generally are not. The angle is not critical and may vary substantially, for instance between about 30 degrees and 90 degrees. As indicated, the overall thickness dimension "d" of the fabric may be between about one or two mm up to about 25 or 30 mm, or even more, with presently preferred dimensions in the range of about two mm to about twelve mm.

As FIG. 3 also shows, the Z direction fibers preferably lie between the two outer layers 22, 24. These outer layers may range from an open honeycomb structure to a more tightly woven warp and weft structure.

Figure 4:
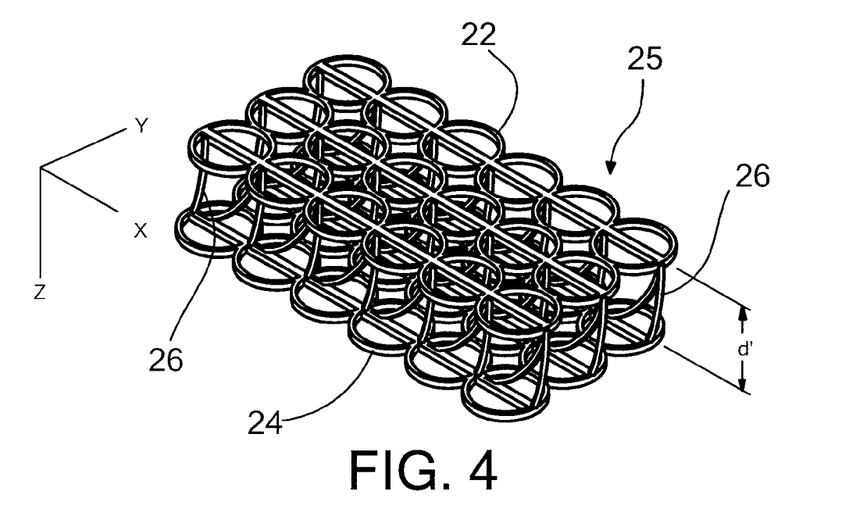
FIG. 4 illustrates a schematic view of a sandwiched material of the present invention.

FIG. 4 schematically represents how the three-dimensional fabric 25 compresses in the Z direction to a lesser thickness "d," when, for example, it is sandwiched between fabric or felt layers 40, 50, or other layers. Even though compressed, the three-dimensional fabric architecture facilitates hardening agent flow, penetration, and distribution throughout the structure including the surrounding and adjacent layers of the entire laminate lay-up. Moreover, when the fabric or felt layers are needle punched, the agent, e.g., liquid resin 65 (FIG. 2), will have a flow path such that it not only fills the intermediate spaces between fibers 26 of material 25 but also flows laterally so as to also fill and saturate both the outer layers 22, 24 and also adjacent felt or fabric layers 40, 50.

In the past, the problem has been that resin must pass more incrementally as the required infusion distance is increased. Thus, "length losses" accumulate as resin 65 (FIG. 2) travels ever more slowly through the flow medium while encountering approximately the same frequency of the fiber "obstacles", which also serve as structural reinforcement. Thus, interlaminar infusion, or infusion from within the substrate or laminate, has achieved little adoption in the prior art despite being naturally advantageous as compared to surface infusion techniques like SCRIMP™, from cost, waste, and property-additive standpoints.

Interlaminar fabric material knit 25 according to this invention, e.g., an added layer, can also be sandwiched and/or placed on either face of the fabric 40, 50 to promote infusion on all sides of the dry laminate, which greatly speeds infusion. Furthermore, this interlaminar material can increase laminate thickness and also allow for better visual quality. The invention further overcomes such problems as incomplete or slow infusion, uneven distribution or pooling of resin, long setup time, material waste, and weakened strength in the finished composite.

Figure 5:
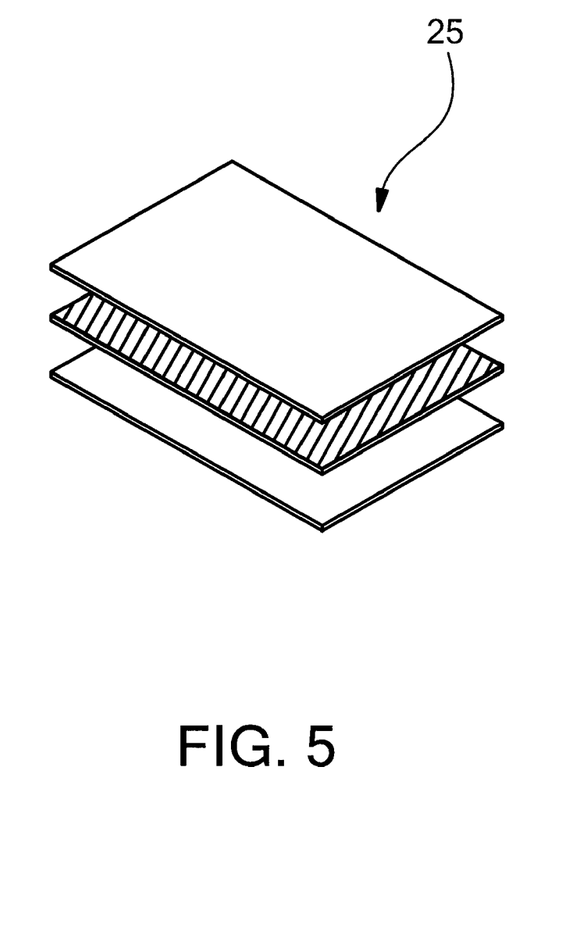
FIG. 5 illustrates a schematic view of another material according to the present invention.

In one embodiment of this invention shown in FIG. 5, the fabric material 25 is constructed of small diameter monofilament polyester, e.g., PET, in the Z plane and with fiberglass yarn, e.g., ECR, on the X/Y fascia planes as both are relatively well-known materials. These materials are preferably knitted together to form the material 25. A reduced diameter and/or stiffness in the Z directional yarn or fiber may require reduced columnar height, and therefore a less free-form thickness of the fiber, to ensure adequate buckling yield and resilient spring-back behind the resin 65 flow front. Despite the reduced free-form thickness, this embodiment may add the same overall thickness to the consolidated laminate as thicker free-form designs.

Figure 6:
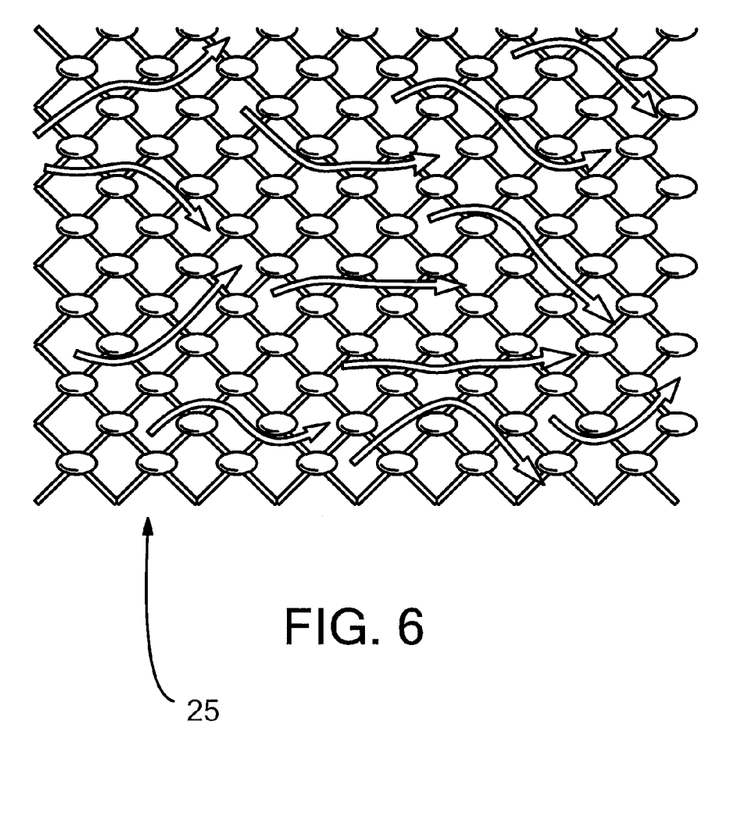
FIG. 6 illustrates a schematic view of another material according to the present invention.

In another embodiment of this invention shown in FIG. 6, a diamond-shaped woven architecture (instead of knitted) provides unique mechanical properties for the three-dimensional material or weave 25 because the fibers are oriented in a preferred direction for strength in the mat laminate 20. The intent of this material is to reduce or eliminate the need for additional reinforcement materials in a given laminate and increase overall cost savings.

The invention also contemplates a fabric design for the material 25, which presents another low-cost material. This product has a similar Z directional structure, but with smooth faces. The X/Y faces here are knitted with multifilament polyester thermoplastics, e.g., PET, with tight face architectures. Smooth faces may help mitigate surface profiling, also known as print. This embodiment also provides an opportunity to use low-cost recycled PET for the multifilament components.

The choice of fibers 37, 37a needle punched in Z direction, e.g., through the fabric 40, 50 and material 25, can be widely varied and the selection thereof is influenced by the mechanical characteristics of the fiber material. These fibers may generally be glass or carbon fibers, although standard carbon fibers are generally not preferred as resiliency and an appropriate bending modulus are the desired characteristics for this element. As indicated, the Z fibers act essentially as joining barbs and also create flow chutes from the outer fabric layers. Therefore, important factors to consider for this selection include a balanced combination of length, column (or denier), spacing, and orientation relative to the outer layers. While deniers of fibers, percentage of glass fiber with respect to other materials, and finished product sizes may vary, the preferred glass content is about 40% by volume 50% by weight, the density is preferably less than one ounce per square yard to fifty-two ounces per square yard and about 1.8-2.2 ounces per square yard, and denier size is about 102-204 with a preferred size of 113. The preferred filament diameter would range about 0.00018-0.00025 with a preference of 0.00023. These have been found to provide sufficient strength and tenacity while maintaining invertibility.

The fiber architecture thereby achieved according to the present invention is optimal for resin 65 infusion processing and can greatly enhance final performance-to-weight properties such as shear strength, rigidity, and damage tolerance. A vast spectrum of physical property enhancements can be further tailored by designing X/Y/Z fiber architectures with hybrid combinations of polyester, glass, carbon, aramid, polyolefin, and/or other materials. The practice of this invention may also provide a relatively low-profile material.

Figure 7:
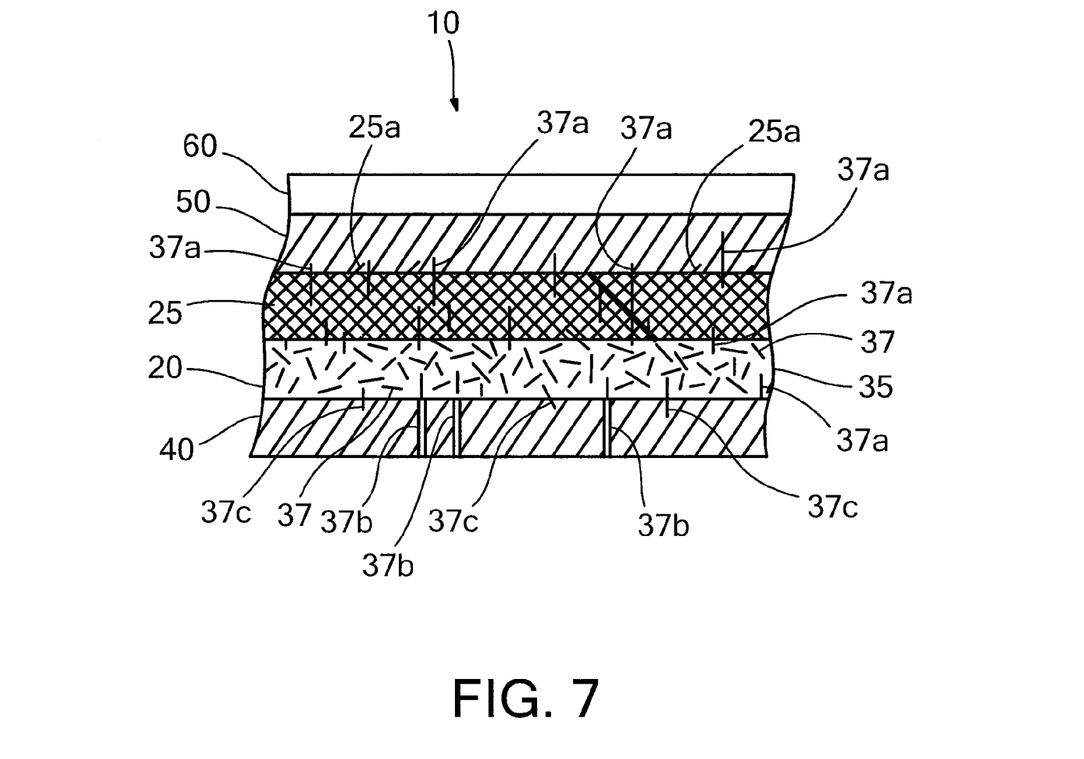
FIG. 7 illustrates a cross-sectional view of one portion of the member of the present invention.

FIG. 7 shows one embodiment of the present invention prior to inversion. In this embodiment, the first layer is a fabric or felt 40. On top of the felt is the ECR fiberglass layer 35. On top of the fiberglass layer 35 is the three-dimensional material 25. Next, preferably is another felt layer 50 and then finally the coating or cover 60.

In this embodiment as shown, there is preferably a top or bottom 22, 24 missing from material 25. Thus, small strands or barbs 25a protrude from the material 25 and into felt layer 50. This preferably occurs when the layers 25, 35, 40, and 50 are sandwiched together by the compression process. The needling process preferably takes place before the coating 60 is added. During the needling process, a small needle (not shown) punches the layers and thus creates small channels 37b in the layer 40. As the needles penetrate through to the fiberglass layer 35, some pieces of fiberglass 37a are pushed into a perpendicular orientation. As shown, not all of the fiberglass fibers 37 are affected by the needling process as they remain in a more random orientation. It should also be noted that during the needling process some fibers 37a are pushed into other layers such as the three-dimensional material layer 25 and the optional additional felt layer 50. Although not shown, small channels are created by the needles as they pass through these additional layers 25 and 50.

Once needling has taken place, the mat 20 may be rolled by a large roller for further compaction. This rolling and compaction process further pushes barbs 25a and fiberglass fibers 37a into the various layers 40, 35, 25, and 50. The needling may also occur through the second felt layer 50 from the side opposite the side closest to layer 40. There, some fibers 37c are pushed into first felt layer 40. Of course, this may also occur during the compaction process so an additional needling step may not be needed. Once the needling is complete, coating or cover layer 60 is added. Preferably, this layer 60 is not punctured so that it acts as a resin catch when the tube is inverted. See, for example, FIGS. 2 and 8.

As mentioned, the resin is preferably added by a pinch and roller process. This can be a separate step or may be part of the compaction process. The channels 37b, perpendicularly orientation fibers 37a, and three-dimensional material 25 all greatly enhance the flow of resin 65 through the felt layers 40, 50 to totally saturate the entire mat 20.

The particular components, compositions, properties, and/or other traits of resin 65 are selected based on the intended end use environment, and corresponding desired use characteristics or regulated standards such as various ASTM standards, and/or others. For example, in some implementations, the member 10 and resin 65 are used in any one(s) of, e.g., oil pipe, HVAC duct, water main, gas main, potable water pipe, manhole line, sewer, industrial effluent lines, electrical conduit repair, and/or others as desired.

In some implementations, resin 65 is a nonstyrenated polyester, vinyl ester, or dicyclopentadiene (DCPD) resin. In particular, resin 65 can be a hydroxylated methacrylate monomer and a polymer selected from the group consisting of vinyl esters and DCPD, for example, a urethane acrylate and a polymer selected from the group consisting of polyesters, vinyl esters, and DCPD. Preferably, the ratio of the weights of monomer and polymer in the resin is in the range of from about 1:9 to 9:1, depending on the properties desired in the resin; the monomer can be hydroxyethyl methyl methacrylate (HEMA), hydroxyethyl propyl methacrylate (HEPMA), or a hydroxyethyl urethane acrylate. In other words, resin 65 can have at least one urethane acrylate monomer and at least one resin selected from the group consisting of polyesters, vinyl esters, and dicyclopentadiene (DCPD), and combinations thereof, wherein the ratio (w/w) of monomer to resin is between about 1:9 and 9:1 or alternatively wherein the ratio (w/w) of monomer to solid resin is at least about 3:7. Of course, other options are possible.

It was found that a suitable resin 65 can be any of a variety of nonstyrenated resins 65, but preferably have a lack of brittleness and good temperature performance or stability. A cross linked, nonstyrenated polyester urethane acrylate resin can be utilized which has a flex modulus of at least about 250,000 psi, a flexural strength of at least about 8000 psi, and a glass transition temperature of at least about 150 degrees F. For such underground plumbing-type, e.g., pipe rehabilitation implementations, it was discovered that a cross linked vinyl ester resin with a flex modulus of at least about 900,000 psi, a flexural strength of at least about 20,000 psi, and a glass transition temperature of at least about 450 degrees F. can prove particularly beneficial.

Furthermore, resin 65 preferably includes nonstyrenated polyester, vinyl ester, and DCPD resins that are characterized by significantly lower VOCs than conventional material resins. Such resins have been found to afford substantial desired performance characteristics for use with liner members 10 used to rehabilitate deteriorating underground piping systems.

Resin 65 may be made by, e.g., the steps of: (a) providing at least one monomer selected from the group consisting of hydroxylated methacrylate and urethane acrylate; and mixing at least one monomer of step (a) with at least one liquefied resin selected from the group consisting of an unsaturated polyester, a vinyl ester, and a DCPD resin under suitable reaction conditions. By suitable reaction conditions, it is meant that the polymers are prepared under conditions known to one of skill in the art.

Regarding the urethane acrylate used in making resin 65, it can be made by reacting an isocyanate with a methacrylate having a hydroxyl group under suitable reaction conditions well known to those skilled in the art to form a urethane acrylate. Urethane acrylate typically decreases brittleness in a polyester resin and enhances impact strength in a vinyl ester resin. A suitable urethane acrylate can be prepared by reacting an isocyanate with a hydroxylated methacrylate such as HEMA or HEPMA to form a urethane acrylate under suitable conditions well-known to one of skill in the art. Urethane acrylates suitable for use in the present invention may be obtained using reaction mixtures comprising HEMA or HEPMA in the range of from about 5% to about 80% and isocyanate in the range of from about 20% to about 95%. One means of obtaining a urethane acrylate suitable for use in the present invention is detailed in the examples below. Briefly, a blocked toluenediisocyanate (TDI) or a straight diphenylmethane diisocynate (MDI) having a percent activate isocyanate groups (NCO %) in the range of from about 1% to about 25% was slowly added to HEMA under agitation. The isocyanate was added gradually over a period of time of at least one hour. The final concentrations of the isocyanate and HEMA were 40% and 60% (w/w), respectively.

Various ones of the specific resins disclosed in U.S. Pat. No. 6,646,057, entitled Production Materials Having Unstyrenated Polyester or Vinyl Ester Resins, expressly incorporated herein in its entirety, have proven suitable for use with liner members 10 during underground pipe rehabilitation procedures.

However, with respect to underground pipe rehabilitation procedures, it was found desirable to slow, impede, retard, or otherwise control the rate of curing of the resin 65. To do so, the effect of, e.g., various peroxide initiators or photoinitiation is altered, reduced, or even temporarily mitigated, to control the rate of curing or resin 65. For example, ones of various blocked metal carboxylates, manganese, cobalt, or various Lewis acids such as lactic acid, can be used to influence the curing rate of resin 65. Regardless of the particular resin and curing activation and control methods, the curing temperature preferably reaches at least about 140 degrees F.

Regardless of the particular composition of the resin 65 and/or resin curing control factors or constituents, especially when used in underground rehabilitation procedures, the resins 65 preferably are low odor or odor free and classified as being within the (USA) Non-Regulated Non-Flammable OSHA Class 3B. Due to numerous risks associated with chemical leeching or wicking into soil and groundwater, in some implementations, the resins 65 preferably contain no solvents, no hazardous air pollutants (HAPs), and no volatile organic compounds (VOCs) nor emit VOCs during use, optionally contain less than 1% HAPs or VOCs.

Furthermore, in some implementations, the resins 65 define a solids yield that exceeds more than 90% solids, optionally 99% solids, or yield 100% solids, which can mitigate shrinkage during curing so that it is negligible, thereby minimizing infiltration between the liner and the pipe. The relatively high solid content of the resins 65 enable them to cure quickly and achieve suitable results, e.g., strength and/or other characteristics, while using relatively less resin 65.

3. In Use and Operation

The member 10 of the present invention is preferably fabricated off-site from the actual place where the pipe is to be rehabilitated. At the fabrication site, the manufacture includes fabricating a glass-reinforced member or liner 10 by preferably laying down a sheet or layer of polyester felt or fabric 40, a layer 35 of loose glass fibers 37 on top of the fabric 40, and a sheet 25 of three-dimensional polyester strand and fiberglass yarn on top of the fibers. Another layer of fabric 50 may then be added on top of the sheet 25. Then, the fabric and fibers are bonded (preferably by needling) to the sheet 25 to form a composite substrate or mat 20. The substrate 20 is then formed into a tube. This is accomplished by connecting, joining, or bonding the edges of the substrate 20, preferably, by an adhesive overlap. In other embodiments, flame joining or stitching may be used. The stitching may include, e.g., a prayer stitch with the edges forming a butt joint. Next, a resin is applied to the tube. A coating 60 may be added on the tube to retain the resin 65 in the tube.

Figure 8:
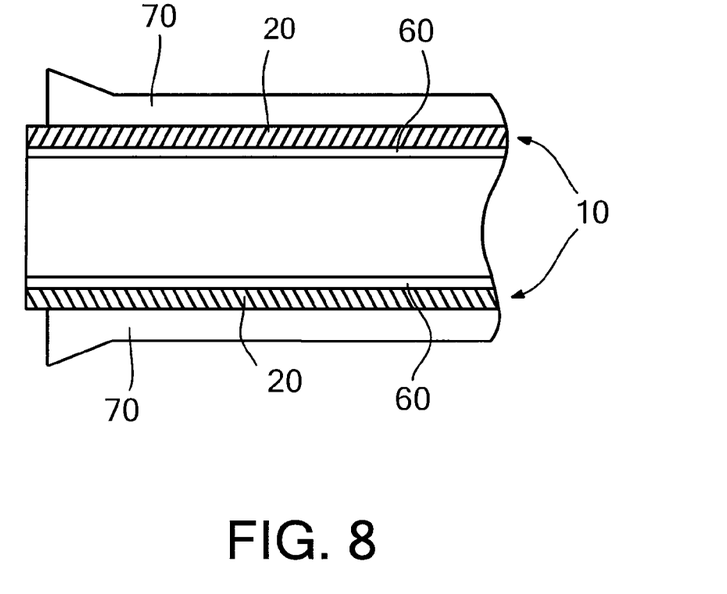
FIG. 8 shows the member of the present invention in place in a pipe.

At the rehabilitation site, the method of installation preferably includes inverting the tube into a pipe 70 to form an inside diameter liner 10. FIG. 8 shows a perspective cutaway view of the tube or pipe 70 with the member 10 inserted therein. When the mat 20 soaked with resin 65 (FIG. 2) is ready, the member 10 is inserted at the mouth of the pipe or tube 70. A gas is then preferably used to invert the member 10 into the tube 70. The tube preferably has its inner sidewalls completely covered with the member 10. A light and a camera are then preferably inserted into the tube to ensure that the member 10 is affixed to the sidewalls of the tube 70. Preferably, the member 10 does not have any wrinkles and no resin 65 is leaking, e.g., through cover 60. After inversion, the coating 60 is now on the inside of the inverted tube member 10. As such, when the liner installation is inspected with the camera, the thin, flexible liner of the invention defies visually conspicuous dimpling, or other visual indicators, at intersection pipe segments. In other words, the thin, flexible characteristics of the liner are clearly visible through the camera, whereby the operator can easily identify such dimples and thus identify locations of hook-ups to homes or other incoming pipe systems.

Once the member 10 is in place and has been inspected, the resin 65 is cured to harden the member 10 in place within pipe 70. In one embodiment, an ultraviolet light cures the resin in the liner 10 to form a hard inner shell within the pipe 70. Alternatively, the liner 10 is cured with hot water or steam.

Once in place, the cured inner knit/weave structure of the liner 10 of the present invention provides 0 degrees, 45 degrees, 90 degrees x-y-z axis strength. Further, given the makeup of the inventive liner, pipe rehabilitation crews do not need as much material to rehab a pipe.

Figure 9:
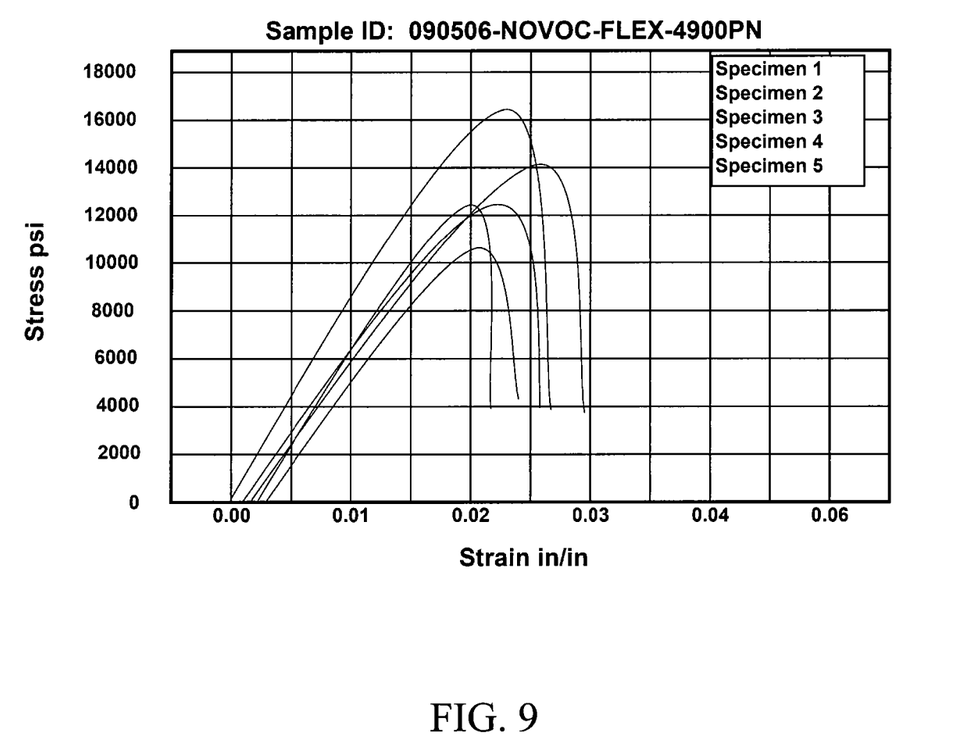
FIG. 9 is a graphical representation demonstrating the strength of the liner of the present invention.

The present invention described herein provides improved tube strengthening. As illustrated in FIG. 9 and the Tables set forth below, the strength of inventive liner has been tested to show the following:

TABLE 2

| | Width (in) | Depth (in) | Strain At Yield | Load At Yield (lbf) | Flexural Strength (psi) | Flexural Modulus (psi) |
|---|---|---|---|---|---|---|
| 1 | 0.489 | 0.220 | .0372 | 27.75 | 7035 | 480897 |
| 2 | 0.496 | 0.230 | .0442 | 31.26 | 7148 | 448915 |
| 3 | 0.495 | 0.235 | .0384 | 28.03 | 6152 | 419574 |
| 4 | 0.500 | 0.222 | .0374 | 27.38 | 6667 | 435943 |
| 5 | 0.495 | 0.229 | .0454 | 32.79 | 7579 | 439087 |
| Mean | 0.495 | 0.227 | .0405 | 29.44 | 6916 | 444883 |
| S.D. | 0.004 | 0.006 | .004 | 2.43 | 537 | 22734 |

In FIG. 9 and the Tables above, data from the 4900PN Sample (which is an embodiment of the present invention) and the Lam 2098 Sample (which is a resin and standard felt typical to the industry) is shown. The specimens graphed in FIG. 9 are different portions taken from the same panel. In reviewing the same, it is obvious that the mechanical properties are quite a bit different, e.g., the invention being stronger. Moreover, if you look at the graphs of FIG. 9, the standard material has a smooth curve to failure while the inventive liner has a jagged edge before it fails. Further, although it is smooth at the beginning, it is thought that the configuration of the inventive liner is transferring its load on all three axes before total failure can occur, resulting in a more robust liner. In other liners, the materials are constructed on the (x, y) plane while the arcs on the graph of FIG. 9 still have a smooth transition to fail, there might be some jagged areas. However, these do not appear as profound as the inventive liner.

Certain preferred steps have been found in testing the liner. For example, in one preferred embodiment, the PET fiber used in the mat is preferably not coated as it typically is with a fatty acid ester coating. The fatty acid ester coating causes problems with the joining of the substrate or laminate and, thus, if it is added, the laminate may not be properly formed.

It has also been found that the cover and other layers which make up the laminate must be free of any debris or other foreign particles such as dust or dirt, which might prohibit the proper joining of the layers of the laminate. Such debris and other foreign materials might also affect the liner's ability to pass potable water testing certifications. It is also important to ensure that the needling of the various layers is done to the proper density. Such needling allows for proper formation of a tightly configured laminate. Further, when the layers, such as the fabric, are run through cutting and slitting operations, it is important that the tensioning on the fabric is appropriate. This proper tension may be applied by having a tension applied to the full length of the roll of fabric. If improper tension is applied to the fabric or another layer, strands of

TABLE 1

| | Width (in) | Depth (in) | Displacement At Yield (Max Load) (in) | Load At Yield (Max Load) (lbf) | Stress At Yield (Max Load) (psi) | Strain At Yield (Max Load) | Flexural Modulus (AltYoung) (psi) |
|---|---|---|---|---|---|---|---|
| 1 | 0.497 | 0.315 | 0.317 | 106.0 | 16524 | 0.023 | 969870 |
| 2 | 0.500 | 0.320 | 0.291 | 77.2 | 11584 | 0.021 | 809981 |
| 3 | 0.501 | 0.318 | 0.344 | 92.2 | 13992 | 0.025 | 923094 |
| 4 | 0.502 | 0.312 | 0.230 | 78.9 | 12420 | 0.016 | 1035449 |
| 5 | 0.500 | 0.338 | 0.249 | 74.6 | 10007 | 0.019 | 545798 |
| Mean | 0.500 | 0.321 | 0.286 | 85.8 | 12911 | 0.021 | 917438 |
| S.D. | 0.002 | 0.010 | 0.047 | 13.2 | 2474 | 0.003 | 97083 |
| C.V. | 0.374 | 3.178 | 16.440 | 15.4 | 19 | 15.772 | 10 | fiber may be inadvertently stretched or torn which would cause the fabric to loose some of its strength and/or become "open faced". In some applications, this might be desirable because it may lead to better joining between the fiber layers. However, in other applications where strength is necessary to ensure proper burst pressure of the liner once it is in place for high-pressure applications, broken or stretched strands would be highly undesirable. Thus, as can be seen, it is important to maintain proper quality control measures in laminate manufacture depending on the end user application of the liner.

There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

Moreover, the individual components disclosed herein need not be formed in the disclosed shapes, or assembled in the disclosed configuration, but could be provided in virtually any shape, and assembled in virtually any configuration. Further, although each layer of the liner is described herein as physically separate, it will be manifest that it may be integrated into the layer with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A glass-reinforced inversion liner system configured to be installed into a tubular member using inversion, the liner system, prior to the installation, comprising:
   a) polyester felt;
   b) a fiberglass layer adjacent an inner surface of the polyester felt;
   c) a three-dimensional material adjacent an inner surface of the fiberglass layer, the three-dimensional material having a plurality of glass fibers;
   d) at least one channel extending through the polyester felt into the fiberglass layer;
   e) resin applied to the polyester felt, wherein a portion of the resin passes through the at least one channel and is delivered to the fiberglass layer;
   f) a cover adjacent an exterior surface of the felt;
   g) fiberglass fragments that are chopped and orientated perpendicular to the felt and interconnecting the three-dimensional material, the fiberglass layer, and the felt; and
   h) an agent for hardening the material in place;
   wherein,
      the resin maintains structural integrity when continuously exposed to water and is substantially free of volatile organic compounds;
      the material is a weave of polyester and ECR fiberglass;
      the cover is a covering comprised of at least one of nylon blend and PET;
      the resin is applied with a resin slug and a pinch roller; and
      the material has a diamond-shaped weave and protruding barbs.

2. The liner system of claim 1, wherein the agent is at least one of: an epoxy, phenolic, polyester, urethane, vinylester, polyimide, and peroxide.

3. The liner system of claim 1, wherein the agent is a resin and is applied with a resin slug and a pinch roller.

4. The liner system of claim 1, wherein the system includes an invertible fiberglass liner for a 12 inch or less tube.

5. The liner system of claim 1, wherein the glass fibers are at least one of a chopped fiber, glass flake, and chunks less than four mm long.

6. The liner system of claim 1, wherein the liner system has a thickness such that when the liner system is installed via inversion, markers are formed along the liner system at locations corresponding to lateral connections to the tubular member.

7. The liner system of claim 6 wherein the markers include at least one of dimples and indentations formed at the locations corresponding to lateral connections to the tubular member.

8. The liner system of claim 1 wherein the three-dimensional material has a first outer layer, a second outer layer, and fibers interconnecting the first and the second outer layers, and wherein the first and the second outer layers are constructed to have an open cell, honeycomb structure.

9. The liner system of claim 1, wherein the diamond-shaped weave provides reinforcement for the liner system.

10. The liner system of claim 1, wherein the diamond-shaped weave comprises a cross-section approximating a parallelogram.

11. The liner system of claim 1, wherein the barbs include a fiberglass that is oriented substantially perpendicular to the polyester felt.

12. A glass-reinforced inversion liner system configured to be installed into a tubular member using inversion, the liner system, prior to the installation, comprising:
   a) polyester felt;
   b) a fiberglass layer adjacent an inner surface of the polyester felt;
   c) a three-dimensional material comprising a weave of polyester and ECR fiberglass adjacent an inner surface of the fiberglass layer and having a plurality of glass fibers;
   d) at least one channel extending through the polyester felt into the fiberglass layer;
   e) a resin applied with a resin slug and a pinch roller to the polyester felt and which maintains structural integrity when continuously exposed to water and is substantially free of volatile organic compounds, wherein a portion of the resin passes through the at least one channel and is delivered to the fiberglass layer
   f) a cover comprising a covering and at least one of: nylon blend or PET adjacent an exterior surface of the felt;
   g) fiberglass fragments that are chopped and oriented perpendicular to the felt and interconnecting the three-dimensional material, the fiberglass layer, and the felt; and
   h) an agent for hardening the material in place;
   wherein the material has a diamond shaped weave and has protruding barbs.

13. The liner system of claim 12, further comprising one of: metal carboxylates, manganese, cobalt, or various Lewis acids such as lactic acid, to influence the curing rate of resin.

14. The liner system of claim 12, wherein the system is used for portable water main rehabilitation.

15. A liner system configured to be installed into a tubular member using inversion, the liner system prior to installation comprising:
   a) a polyester felt having an inner surface and an outer surface;
   b) a fiberglass layer having an inner surface and an outer surface and positioned adjacent to the inner surface of the polyester felt;
   c) a three-dimensional material positioned adjacent the inner surface of the fiberglass layer and including a plurality of glass fibers;
   d) at least one channel extending through the polyester felt into the fiberglass layer;
   e) a resin applied to the polyester felt and a portion of the resin passing through the at least one channel and delivered to the fiberglass layer;
   f) a cover adjacent the outer surface of the polyester felt;
   g) a plurality of fiberglass fragments that are chopped and oriented perpendicular to the felt and interconnecting the three-dimensional material with the fiberglass layer and the polyester felt; and
   h) a hardening agent configured to harden the three-dimensional material in place;
   wherein the three-dimensional material has a diamond shaped weave.

16. The liner of claim 15, wherein the resin maintains structural integrity when exposed to water and is substantially free of volatile organic compounds.

17. The liner of claim 15, wherein the three-dimensional material is a weave of polyester and ECR fiberglass.

18. The liner of claim 15, wherein the cover is comprised of at least one of a nylon blend and PET.

19. The liner of claim 15, wherein the resin is applied with a resin slug and a pinch roller.

20. The liner of claim 15, wherein the three-dimensional material includes a plurality of protruding barbs.

* * * * *